US007486471B2

(12) United States Patent
DeRosa

(10) Patent No.: US 7,486,471 B2
(45) **Date of Patent: *Feb. 3, 2009**

(54) METHODS AND APPARATUS FOR CONSTRAINING TRANSDUCER VELOCITY BASED ON DISK ROTATIONAL LATENCY WHILE SEEKING IN A DISK DRIVE

(75) Inventor: Jeffrey V. DeRosa, Shrewsbury, MA (US)

(73) Assignee: Seagate Technology LLC, Scotts Valley, CA (US)

(*) Notice: Subject to any disclaimer, the term of this patent is extended or adjusted under 35 U.S.C. 154(b) by 122 days.

This patent is subject to a terminal disclaimer.

(21) Appl. No.: 11/507,186

(22) Filed: Aug. 21, 2006

(65) Prior Publication Data

US 2007/0206318 A1 Sep. 6, 2007

Related U.S. Application Data

(60) Provisional application No. 60/779,123, filed on Mar. 3, 2006.

(51) Int. Cl.
*G11B 5/596* (2006.01)

(52) U.S. Cl. ................................ 360/78.08; 360/78.08

(58) Field of Classification Search ....................... None
See application file for complete search history.

(56) References Cited

U.S. PATENT DOCUMENTS

| | | | | |
|---|---|---|---|---|
| 6,624,964 | B1 * | 9/2003 | Pirzadeh | 360/78.07 |
| 6,987,639 | B1 * | 1/2006 | Yu | 360/78.04 |
| 7,023,652 | B1 | 4/2006 | DeRosa | 360/78.04 |
| 7,324,296 | B1 * | 1/2008 | DeRosa | 360/59 |
| 2006/0023616 | A1 * | 2/2006 | Nagai et al. | 369/272.1 |

* cited by examiner

*Primary Examiner*—Jason C Olson
(74) *Attorney, Agent, or Firm*—Myers Bigel Sibley & Sajovec, P.A.

(57) ABSTRACT

Methods of controlling seeking of a transducer that is adjacent to a rotatable disk in a disk drive include determining an expected seek time associated with moving the transducer from an initial track to a target track on the disk. An expected rotational latency time is determined which is associated with rotating the disk to move an addressed data block on the target track adjacent to the transducer after the transducer would be expected to arrive at the target track. A scaled velocity limit is determined which is based on the expected seek time and the expected rotational latency time. While seeking the transducer from the initial track to the target track, the radial velocity of the transducer relative to the disk is regulated in response to the scaled velocity limit. Related apparatus for controlling seeking of a transducer are also described.

24 Claims, 8 Drawing Sheets

METHODS AND APPARATUS FOR CONSTRAINING TRANSDUCER VELOCITY BASED ON DISK ROTATIONAL LATENCY WHILE SEEKING IN A DISK DRIVE

RELATED APPLICATION

This application claims the benefit of and priority to U.S. Provisional Patent Application No. 60/779,123 titled "ALGORITHMIC VELOCITY JUST-IN-TIME-SEEKING", filed Mar. 3, 2006, the disclosure of which is hereby incorporated herein by reference as if set forth in its entirety.

FIELD OF THE INVENTION

The present invention generally relates to digital data storage devices and, more particularly, to methods, apparatus, and computer program products for seeking a transducer between tracks on a disk in a disk drive.

BACKGROUND OF THE INVENTION

Disk drives are digital data storage devices which allow host computer systems to store and retrieve large amounts of data in a fast and efficient manner. A typical disk drive includes one or more magnetic recording disks which are mounted to a rotatable hub of a spindle motor and rotated at a high speed. An array of read/write transducers is disposed adjacent to surfaces of the disks to transfer data between the disks and a host computer. The transducers can be radially positioned over the disks by a rotary actuator and a closed loop servo system, and can fly proximate the surfaces of the disks upon air bearings.

A plurality of nominally concentric tracks can be defined on each disk surface. A preamp and driver circuit generates write currents that are conducted through the transducer to selectively magnetize the tracks during a data write operation, and amplifies read signals generated by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a target track on the corresponding disk surface. The servo system applies current to an actuator motor to first accelerate and then decelerate the transducer toward the target track.

During the seek, the servo system may repetitively measure the actual velocity of the transducer and adjust the current in relation to velocity error (i.e., the difference between the actual velocity and a target velocity). As the transducer approaches the target track, the servo system initiates a settle mode to bring the transducer to rest over the target track within a selected settle threshold, such as a percentage of the track width from track center. Thereafter, the servo system enters the track following mode wherein the transducer is nominally maintained over the center of the target track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, disk drives can attempt to obtain minimum average seek times. However, the forces that can be exerted on the actuator to obtain minimum average seek times can cause vibration of the actuator and the disk drive, and can result in a decrease in the seek performance and undesirable acoustical noise. Moreover, vibrations from one disk drive may interfere with the operation of other disk drives mounted within the same enclosure.

In addition, the electric current applied to the actuator motor to obtain minimum seek times may result in undesirable heating of the disk drive assembly and/or elements thereof. Heating of the disk drive assembly may have a number of deleterious effects on its operation. For example, since various components of a disk drive may have different coefficients of thermal expansion, heating of the disk drive, or components thereof, may result in mechanical instability and associated errors in drive operation. Further, excessive heat may damage sensitive components of a disk drive, such as the platter surfaces, the printed circuit board assembly (PCBA) and associated components, the read/write transducer, the pre-amplifier circuit and/or other components.

SUMMARY OF THE INVENTION

Methods of controlling seeking of a transducer that is adjacent to a rotatable disk in a disk drive according to some embodiments of the invention include determining an expected seek time associated with moving the transducer from an initial track to a target track on the disk. An expected rotational latency time is determined which is associated with rotating the disk to move an addressed data block on the target track adjacent to the transducer after the transducer would be expected to arrive at the target track. A scaled velocity limit is determined which is based on the expected seek time and the expected rotational latency time. While seeking the transducer from the initial track to the target track, the radial velocity of the transducer relative to the disk is regulated in response to the scaled velocity limit.

The radial velocity of the transducer may be regulated by repetitively sensing its velocity while seeking it from the initial track to the target track, and limiting its radial velocity to no more than about the scaled velocity limit. The current that is conducted through a motor in the disk drive which moves the transducer radially across the disk may be reduced, such as to about zero, as the sensed radial velocity approaches the scaled velocity limit.

Further methods and related apparatus for controlling seeking of a transducer are described herein.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term “comprising” or “comprises” is open-ended, and includes one or more stated elements, steps and/or functions without precluding one or more unstated elements, steps and/or functions. As used herein the terms “and/or” and “/” include any and all combinations of one or more of the associated listed items.

The present invention may be embodied as apparatus, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
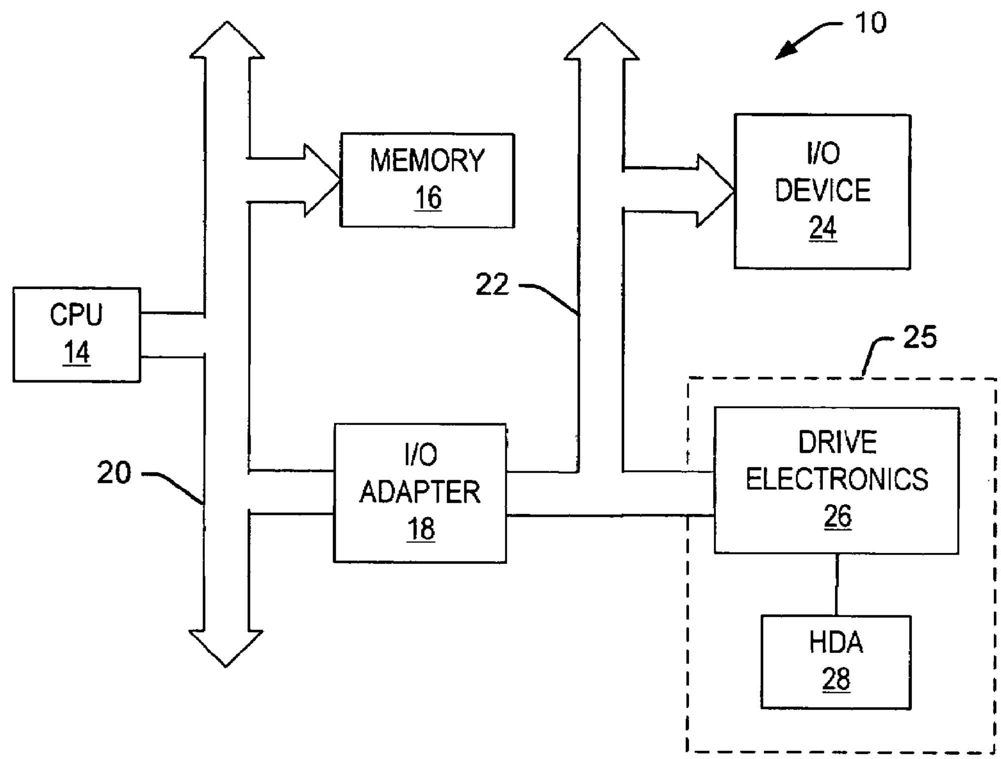
FIG. 1 is a block diagram of an exemplary computer system that includes a disk drive.

Referring to FIG. 1, an exemplary computer system 10 is shown that includes a central processing unit (“CPU”) 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 (“HDA”).

Figure 2:
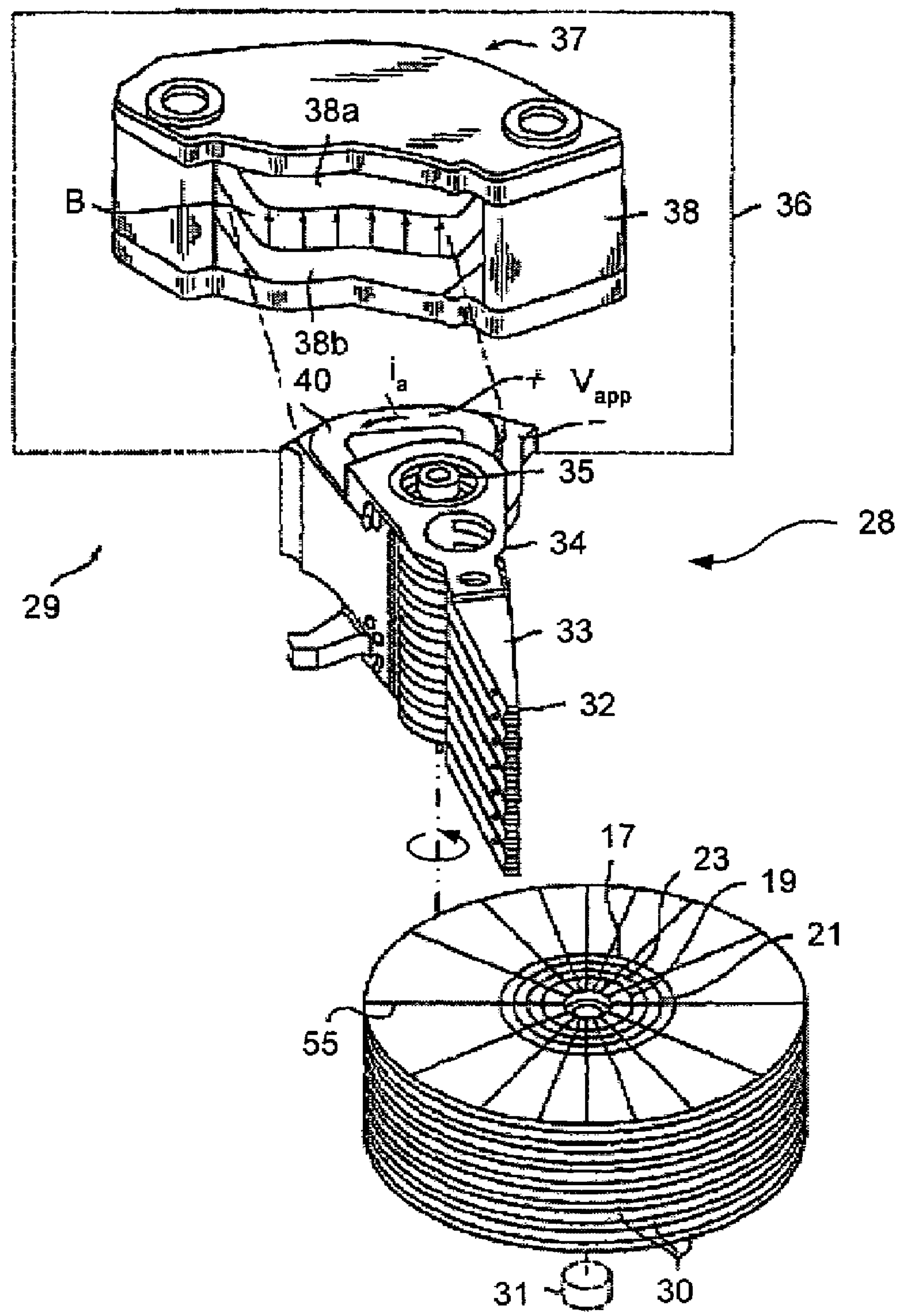
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. An actuator motor 36, which may be a Voice Coil Motor (VCM), controls the radial movement of the actuator arms 34 in proportion to an input actuator current $i_a$. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38*a*, 38*b* coupled together via a pair of sidewalls to form a flat toroidal shaped member 38. A wire coil 40 is disposed between the two plates 38*a* and 38*b*. The magnet 37 may generate a constant magnetic field B between the plates 38*a* and 38*b*. When the input actuator current $i_a$ is induced in the coil 40 disposed in the magnetic field B, a torque is produced on the actuator arms 34 resulting in radial motion of the arms 34 about pivot point 35. The polarity of the input actuator current $i_a$ determines the direction of radial motion of the actuator arms 34.

Figure 3:
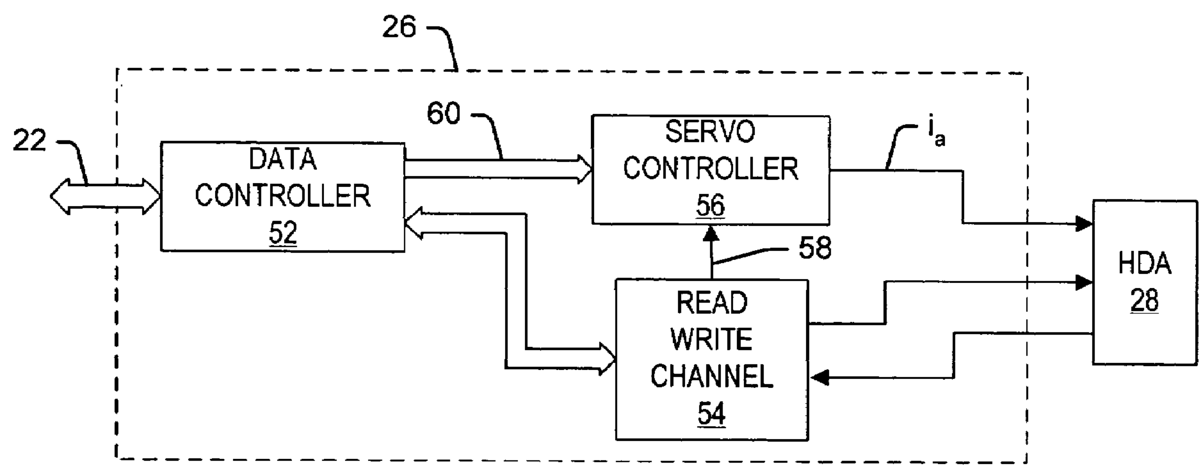
FIG. 3 is a block diagram of the drive electronics of the disk drive according to some embodiments of the present invention.

Referring to FIG. 3, the drive electronics 26 (FIG. 1) includes a data controller 52, a read/write channel 54, and a servo controller 56. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54. The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducer 32 in relation to that track and data block within the track. The transducer location information is induced into the transducer 32, converted from analog signals to digital data in the read/write channel 54, and transferred to the servo controller 56. The servo controller 56 can use the transducer location information for performing seek and tracking operations of the transducer 32 over the disk tracks 17.

The data controller 52 also provides data that identifies the target track location and the addressed data block on lines 60 to the servo controller 56. The time to perform a seek from between an initial track to a target track is typically known as "seek time." The servo controller 56 generates a current command that is converted into the input actuator current $i_a$, and provided to the actuator 29 to radially move the transducer 32 across the disk 30. The seek time is thereby dependent on the magnitude of the current command.

Once the transducer 32 has reached the target track 17, the time required to rotate the disk 30 to a desired sector to perform a particular data access can be referred to as "rotational latency time," or, more succinctly, "rotational latency." The rotational latency can be the time required to rotate from a current position to a desired position on the disk 30. Thus, the rotational latency may be as great as the time required for one revolution of the disk 30. The rotational latency is dependent on the angular velocity of the disk 30, which is usually expressed in revolutions per minute (RPM). Generally, the total time to access an addressed data block on the disk 30 is about equal to the sum of the seek time, the rotational latency, and the time required to read or write the data.

Figure 5:
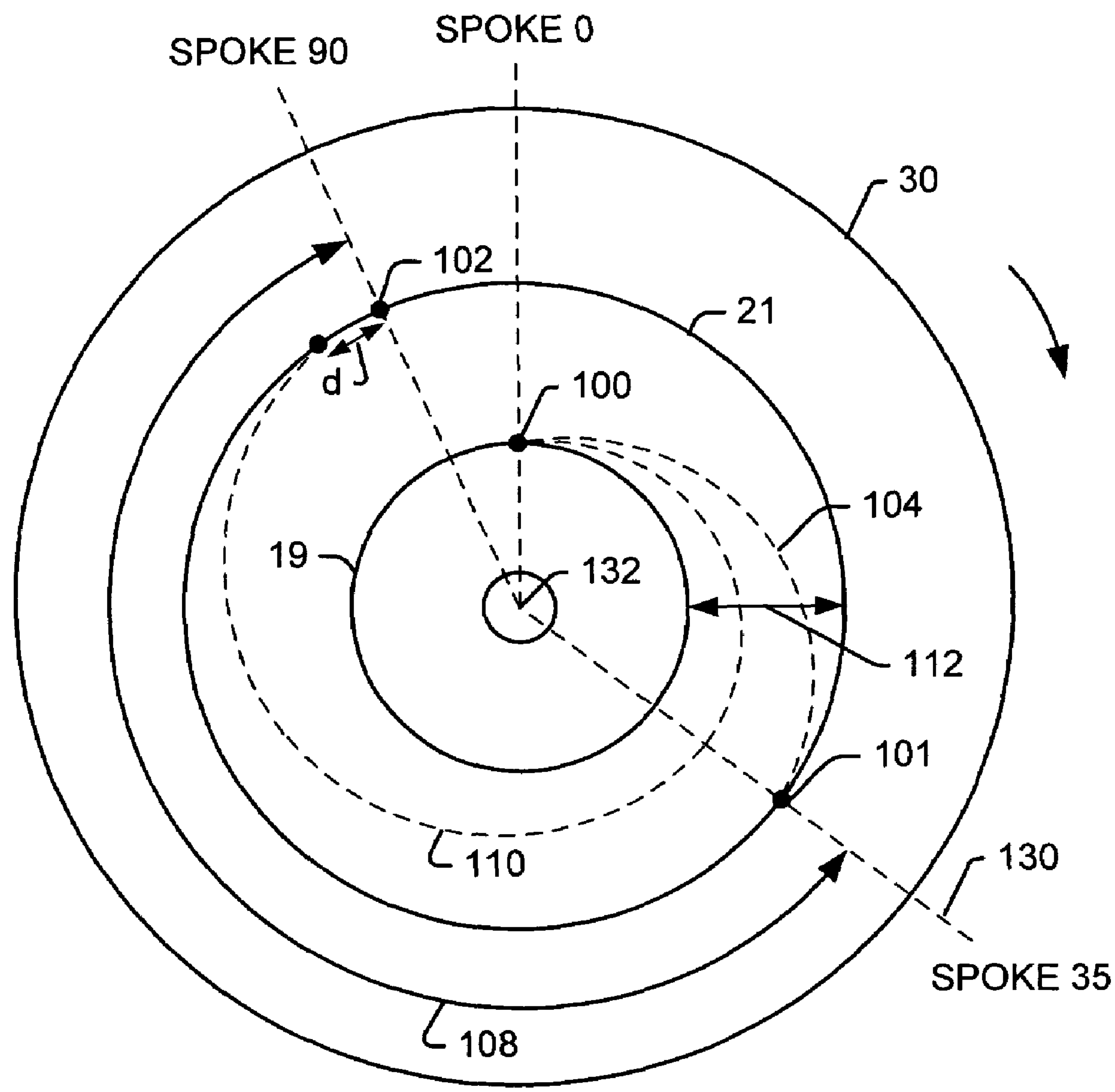
FIG. 5 is a diagram of a data storage disk that illustrates a seek operation according to some embodiments of the present invention.

Referring now to FIG. 5, an exemplary one of the disks 30 is shown that illustrates a start location 100 of the transducer 32 (FIG. 2) on the initial track 19, and an addressed data block 102 on the target track 21 to which the CPU 14 has requested access. In one example seek operation, which may correspond to use of a maximum current command that corresponds to saturation of the motor 36, the servo controller 56 may move the transducer 32 along path 104 between the initial track 19 and the target track 21. Strong acceleration and deceleration of the actuator 29 can cause significant noise and vibration of the HDA 29 components, may cause degraded seek performance and/or off-track writing of data, and may consume excessive power. Accordingly, it may be advantageous to increase the seek time and allow a decrease in the acceleration and deceleration of the actuator 29.

In the exemplary seek operation, after seeking to the target track 21 along path 104, the disk 30 must continue to rotate an angular amount 108 (i.e. the rotational latency) before the transducer 32 reaches the addressed data block 102. According to various embodiments of the present invention, the servo controller 56 determines a scaled velocity limit based on the expected seek time and the expected rotational latency time, and regulates the radial velocity of the transducer 32 in response to the scaled velocity limit while seeking the transducer 32 from the initial track 19 to the target track 21. For example, the servo controller 56 may regulate the radial velocity so that the transducer 32 reaches the target track 21 a predetermined time/distance d before the addressed data block 102 reaches the transducer 32, such as along path 110. The predetermined time/distance d may correspond to a typical time for the transducer to settle on the target track 21 following a seek operation.

The disk 30 may be logically divided into a number of evenly spaced wedges or spokes 130 extending radially away from a center point 132 of the disk 30. Since the disk 30 rotates at a constant rotational speed, the number of spokes per unit time passing under the transducer 32 is also constant. Thus, times associated with the disk drive, such as seek times, latency times, delay times, etc., may be measured in terms of the number of spokes 130 passing under the transducer 32 during the relevant period. For example, assuming a disk rotating at 10,000 revolutions per minute is divided into 100 spokes, then the time between spokes is 60 microseconds. Thus, a delay of 20 spokes corresponds to a delay of 1.2 milliseconds.

As shown in FIG. 5, the start location 100 of the transducer 32 on track 29 of the disk 30 may be located at spoke 0. The target location of the addressed data block 102 on track 21 may be located at spoke 90. In a seek operation that corresponds to the use of a maximum current command (i.e., minimum seek time), the servo controller 56 may move the transducer 32 along path 104 between the initial track 19 and the target track 21, reaching track 21 at spoke 35. Accordingly, the rotational latency associated with path 104 is 55 spokes.

For the path 110, however, the rotational latency may be less than one spoke, since the transducer 32 arrives at the target track 21 a predetermined time/distance d before the addressed data block 102 (at spoke 90) reaches the transducer 32. The time/distance d required for the transducer 32 to settle on the target track 21 may in some embodiments be less than one spoke.

Figure 4:
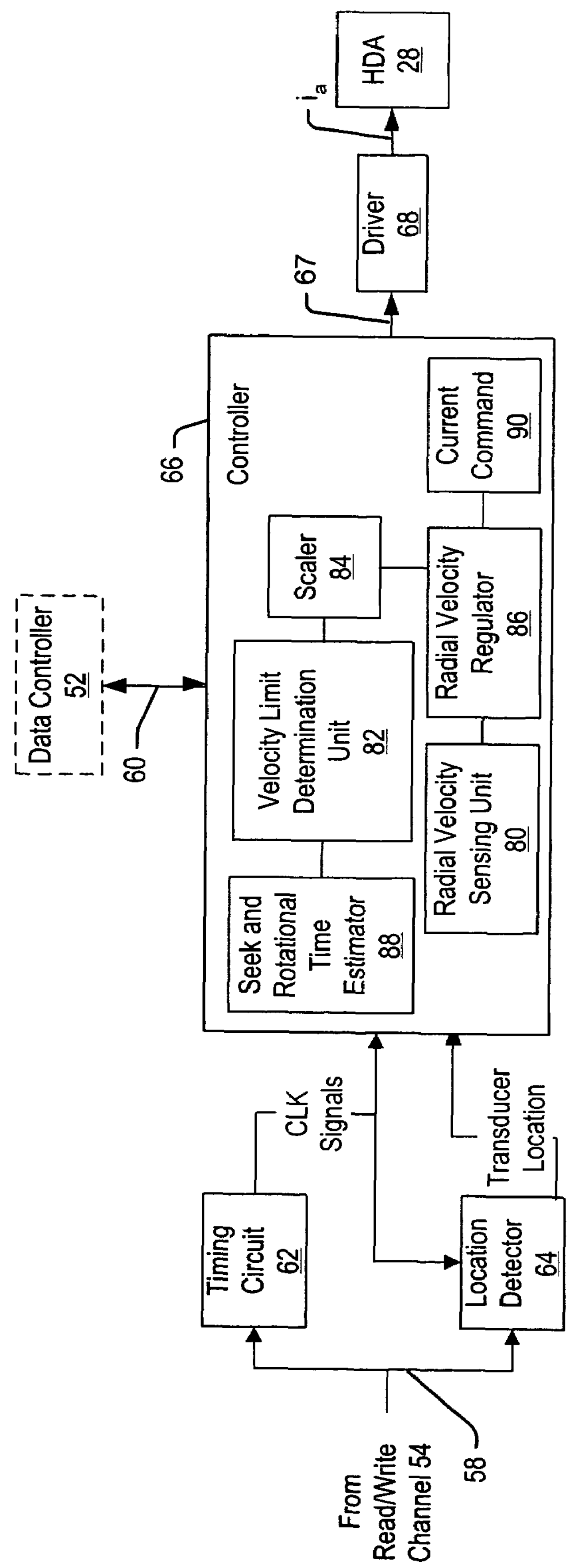
FIG. 4 is a block diagram of the servo controller according to some embodiments of the present invention.

These and other aspects of the servo controller 56 are described with reference now to FIG. 4 in accordance with some embodiments of the present invention. The servo controller 56 can include a timing circuit 62, a location detector 64, a controller 66, and a driver 68. The timing circuit 62 can generate clock signals synchronized with the passage of servo sectors 55 on tracks under the transducer 32. The timing circuit 62 can include a counter and a phase locked loop for generating the clock signals. Based on the clock signals from the timing circuit 62 and transducer location data provided by the read/write channel 54, the location detector 64 detects a location of the transducer 32 relative to tracks on the disk 30 and data blocks within the tracks 17. The detected transducer location information in each servo sector 55 provides the address of the track which contains the servo sector 55, and therefore, the location of the transducer 32 relative to that track. The timing circuit 56 is synchronized with the read/write channel 54, and the location detector 64 receives the transducer location data from the read/write channel 54.

The controller 66 controls movement and positioning of the transducer 32 during seek operations. In response to clock signals from the timing circuit 62, where each clock signal indicates passage of a servo sector 55 under the transducer 32, the controller 66 obtains the transducer location information from the location detector 64. The controller 66 can include a radial velocity sensing unit 80, a velocity limit determination unit 82, a scaler 84, a radial velocity regulator 86, a seek and rotational time estimator 88, and a current command unit 90.

The seek and rotational time estimator 88 determines an expected seek time and expected rotational latency time based on the location of the transducer 32 and the location of the addressed data block 102. The expected seek time may be determined based on locations of the initial track 19 and the target track 21. For example, the expected seek time may be selected from among a table of a plurality of seek distances (e.g., number of tracks from the initial track 19 to the target track 21) and corresponding expected seek times. Such a table of seek distances and expected seek times may, for example, have common values that are used in multiple disk drives, rather than being unique to each model of disk drive and/or a particular one of the disk drives. A seek distance 112 between the initial track 19 and the target track 21 is shown in FIG. 5. The expected rotational latency time may be determined based on an expected location of the transducer 32 after seeking to the target track 21 and based on the location of the addressed data block 102 (e.g., the expected rotation latency time corresponding to rotating the angular amount 108).

The velocity limit determination unit 82 determines a velocity limit value based on a maximum current that during normal operation can be conducted through the actuator motor 36 while moving the transducer 32 radially across the disk 30. For example, the maximum current may correspond to a current that saturates the motor 36 when moving the transducer 32 during a seek operation. The velocity limit value may be a constant value predefined based on characteristics of the motor 36, or may be a variable value that is determined based on, for example, the seek distance. For example, the velocity limit value may be selected among a plurality of predefined velocity limit values based on locations of the initial track and the target track.

The scaler 84 scales the velocity limit value from unit 82 to generate a scaled velocity limit which is used to regulate the radial velocity of the transducer during a seek operation. More particularly, the scaler 84 determines a scaling ratio based on the following Equation 1:

$$\text{Scaling Ratio} = \frac{\text{Expected Rotational Latency}}{\text{Expected Seek Time}}. \quad \text{(Equation 1)}$$

The scaler 84 generates a velocity scale factor based on the following Equation (2):

$$\text{Velocity Scale Factor} = \frac{\text{Tuning Gain}}{\text{Scaling Ratio} + \text{Tuning Gain}}, \quad \text{(Equation 2)}$$

where the tuning gain is a predetermined number which may be less than 1. For example, in some disk drives the tuning gain may have a nominal value of about 0.5, although other tuning gain values may be used.

The scaler 84 combines (e.g., by multiplying) the velocity limit value from unit 82 and the velocity scale factor from Equation (2) to generate the scaled velocity limit (e.g., scales the velocity limit value to generate the scaled velocity limit). The radial velocity sensing unit 80 repetitively senses the radial velocity of the transducer 32 relative to the disk 30 while the transducer 32 is moved during a seek operation from the initial track to the target track. For example, the unit 80 may sense the radial velocity based on a measurement of the number of tracks traversed relative to the clock signals from the timing circuit 62 indicating the passage of servo sectors 55 under the transducer 32. The radial velocity regulator 86 limits the radial velocity of the transducer 32 during the seek operation to no more than about the scaled velocity limit generated by the scaler 84.

For a given expected seek time, the scaling ratio may be small whenever the expected rotational latency time is small, which may occur for short or long seeks. For example, as expected rotational latency approaches zero, the scaling ratio approaches zero, the velocity scale factor approaches one, and consequently, the scaled velocity limit approaches the velocity limit value from the velocity limit determination unit 82. When the scaling ratio is large, for example when the expected rotational latency time is substantially greater than the expected seek time, the scaling ratio may be large, which results in a relatively small velocity scale factor.

For example, for a HDA 28 that has 10K RPM disks 30 with a random workload (i.e., no command reordering), the average rotational latency time will be about 3 milliseconds, corresponding to an average of one half of a revolution of the disks 30. The average seek operation may be assumed to ⅓of the available stroke (i.e., between the innermost and outermost tracks), and correspond to a seek time of 4.0 milliseconds. The tuning gain is assumed to be 0.5. Accordingly, the average velocity scale factor used to generate the scaled velocity limit from the velocity limit value is 0.4 (i.e., scale factor=0.5/(3.0/4.0+0.5)). The scaled velocity limit will therefore typically have a peak value that is reduced by 60%. In a variation of the exemplary embodiment, an input/output operation that has a rotational latency of a full revolution of the disks 30 will have a rotational latency time of about 6 milliseconds, and a corresponding velocity scale factor of 0.25 (i.e., scale factor=0.5/(6.0/4.0+0.5). The scaled velocity limit will therefore have a peak velocity that is reduced by 75%. The maximum velocity is thereby slowed down, which may reduce power consumption, noise, and vibration that may be caused in the HDA 29 components, and may improve the seek performance and/or off-track writing of data.

The current command module 90 generates a current command 67 to the driver 68, which generates the input actuator current $i_a$ provided to the motor 36 (FIG. 2) in the HDA 28. The transducer 32 is moved radially inward or radially outward during a seek operation in response to the input actuator current $i_a$ and polarity thereof applied to the motor 36. The radial velocity regulator 86 limits the radial velocity of the transducer 32 during a seek operation by regulating the magnitude of the current command 67 generated by the current command module 90.

By way of three examples, the operation of a full power seek, a just-in-time seek without limiting the maximum radial velocity of the transducer 32, and a just-in-time seek in which the maximum radial velocity of the transducer 32 is regulated pursuant to some embodiments of the present invention are described below with reference to FIGS. 6-11.

Figure 6:
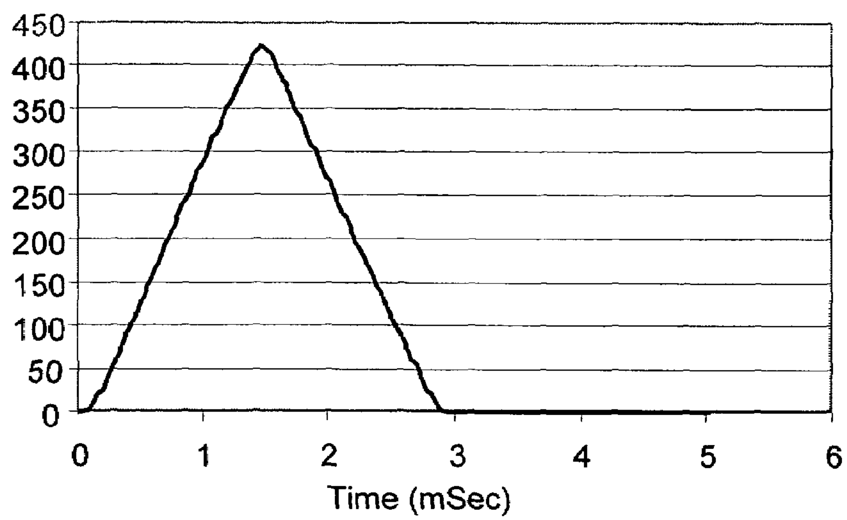
FIG. 6 is a graph of radial velocity of a transducer during a full power (minimum time) seek operation.
Figure 9:
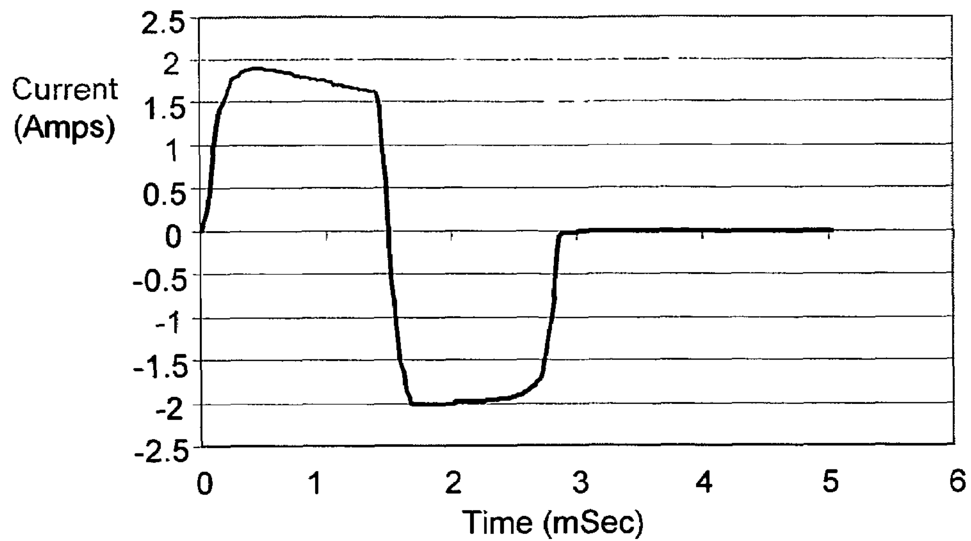
FIG. 9 is a graph of actuator motor current during a full power (minimum time) seek operation corresponding to the velocity profile of FIG. 6.

FIGS. 6 and 9 are graphs that illustrate the radial velocity of the transducer 32 and the motor 36 current ($i_a$), respectively, during a full power seek (minimum seek time) operation. Accordingly, in FIGS. 6 and 9 correspond to a seek operation in which the transducer 32 is moved with the highest obtainable velocity, without constraint by a radial velocity regulator, to a target track. As shown in FIGS. 6 and 9, the motor 36 current quickly rises to a maximum current level that saturates the motor 36 and accelerates the transducer 32 until the transducer 32 has been moved about half-way through the seek distance to the target track, and at which time transducer 32 has obtained an unregulated peak velocity level (e.g., about 425 tracks/spoke at about 1.5 mSec), and then the motor 36 current quickly reverses to an opposite polarity maximum current level to decelerate the transducer 32 to zero velocity at the target track. As explained above, such rapid acceleration and abrupt reversal to deceleration can consume an unnecessary amount of power and cause undesirable vibration.

Figure 7:
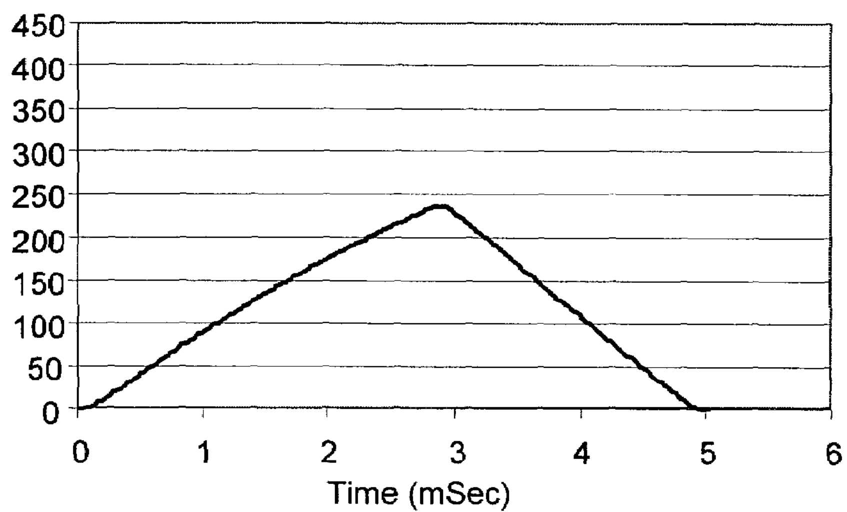
FIG. 7 is a graph of radial velocity of a transducer during a just-in-time seek operation.
Figure 10:
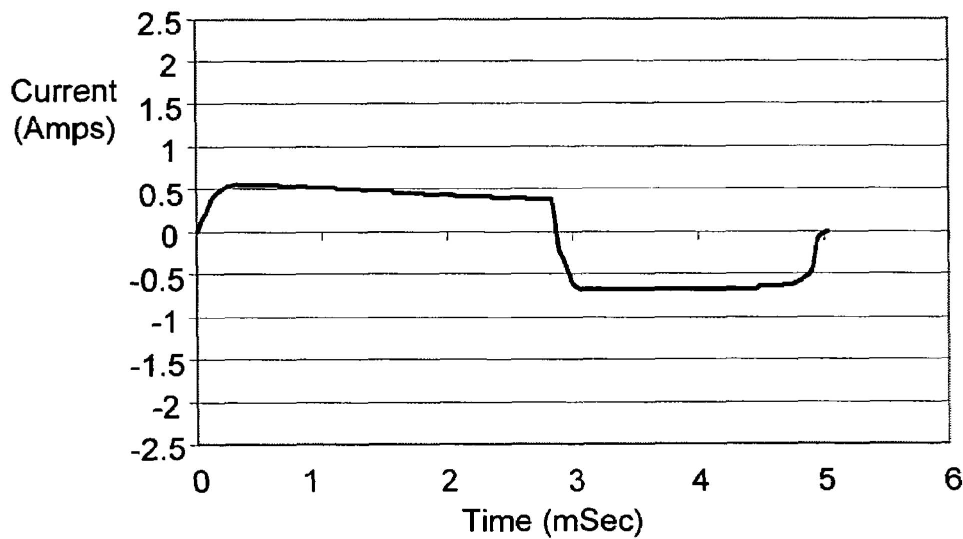
FIG. 10 is a graph of actuator motor current during a just-in-time seek operation corresponding to the velocity profile of FIG. 7.

FIGS. 7 and 10 are graphs that illustrate the radial velocity of the transducer 32 and the motor 36 current, respectively, during a just-in-time seek operation in which the motor 36 current is generated based on a scaled maximum defined level. As shown in FIGS. 7 and 10, the motor 36 current quickly rises to a level that is limited based on a scaled maximum defined current level and accelerates the transducer 32 until the transducer 32 has been moved about half-way through the seek distance to the target track, and at which time transducer 32 has obtained an peak velocity level (e.g., about 245 tracks/spoke at about 3 mSec), and then the motor 36 current quickly reverses to an opposite polarity scaled level to decelerate the transducer 32 to zero velocity at the target track. As explained above, such acceleration and abrupt reversal to deceleration can consume an unnecessary amount of power and cause undesirable vibration.

Figure 8:
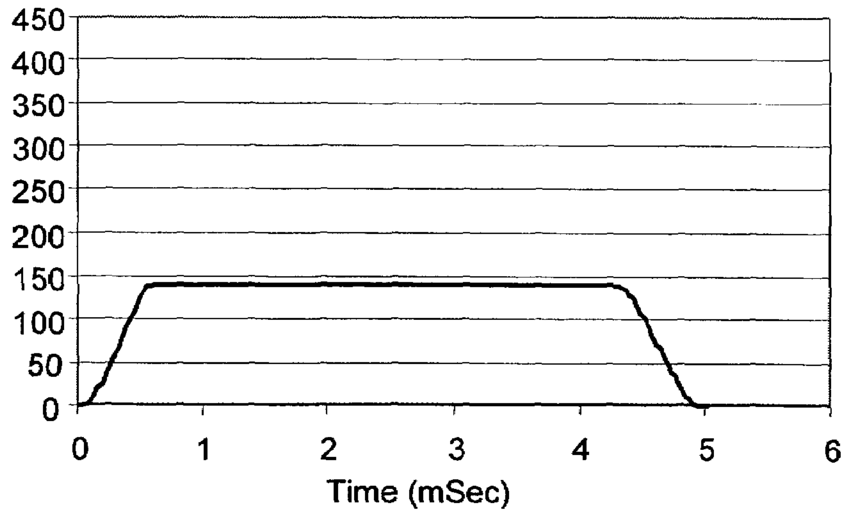
FIG. 8 is a graph of radial velocity of a transducer that is regulated in response to a scaled velocity limit determined based on expected seek time and expected rotational latency time according to some embodiments of the present invention.
Figure 11:
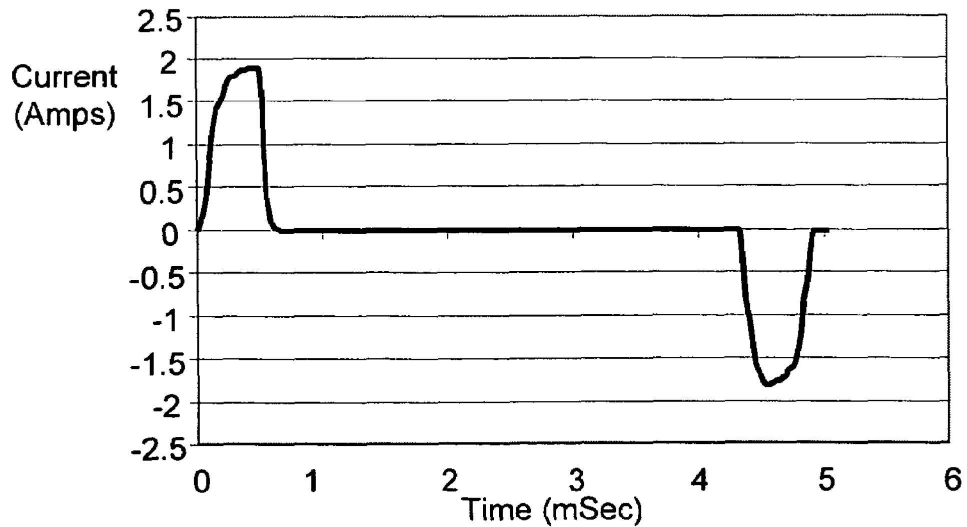
FIG. 11 is a graph of actuator motor current during a seek operation corresponding to the velocity profile of FIG. 8 according to some embodiments of the present invention.

FIGS. 8 and 11 are graphs that illustrate the radial velocity of the transducer 32 and the motor 36 current, respectively, during a just-in-time seek operation in which the maximum radial velocity of the transducer 32 is regulated pursuant to some embodiments of the present invention. As shown in FIG. 11, the current command unit 90 initially raises the motor 36 current quickly to a maximum current level that saturates the motor 36 (e.g., about 2 amps at about 0.25 mSec), and, thus, has a similar current waveform to that shown in FIG. 9 for the full power seek during the period between 0 mSec and about 0.25 mSec. As the radial velocity of the transducer 32 rises to the level of the scaled velocity limit generated by the scaler 84, the radial velocity regulator 86 controls the current command unit 90 to reduce the motor 36 current to zero in order to limit the radial velocity of the transducer 32 to no more than the scaled velocity limit. Accordingly, as shown in FIGS. 8 and 11, the radial velocity of the transducer 32 increases up to the scaled velocity limit (e.g., a velocity of about 150 tracks/spoke at about 0.5 mSec), at which time the motor 36 current is reduced to zero, and the transducer 32 then coasts at about that scaled velocity limit while the transducer 32 moves toward the target track during the seek operation.

When the radial velocity regulator 86 determines that the transducer 32 has moved to within a threshold number of tracks of the target track (e.g., at about 4.25 mSec), it increases motor 36 current in an opposite direction to reduce the radial velocity of the transducer 32 to zero as the transducer 32 reaches the target track. Accordingly, as shown in FIGS. 8 and 11, at about 4.25 mSec the radial velocity regulator 86 controls the current command module 90 to increase motor current 36 to about −2 amps and thereby decelerate the transducer 32 from a velocity of about 150 tracks/spoke to zero tracks/spoke.

It is noted that motor 36 current of FIG. 10 for the just-in-time seek without velocity constraint has an average value of about 0.55 amp, while the just-in-time seek of FIG. 11 with velocity constraint has a lower average value of about 0.33 amps. According, the carrying out a just-in-time seek with velocity constraint may reduce power consumption by the disk drive.

The controller 66 may selectively limit the maximum radial velocity of the transducer 32 during a seek operation based on, for example, when a threshold number of tracks are between the initial track and target track (i.e., at least a threshold seek distance). Thus, for example, the controller 66 may not carry out operations to limit the maximum radial velocity of the transducer 32 for short seek distances, while it may carry out operations to limit the maximum radial velocity as described herein for longer seek distances where the power savings and/or vibration reduction would be more beneficial. When a seek operation will be across less than the threshold number of tracks, the controller 66 may carry out operations for a just-in-time seek operation in which the motor 36 current is limited to no more than a maximum defined current level, such as was discussed with regard to FIGS. 7 and 10. Accordingly, a seek operation may be selectively carried out by the controller 66 either as a just-in-time seek operation with motor 36 current limited to no more than a maximum defined level for relatively short seek distances, or as a just-in-time seek operation with transducer 32 radial velocity limited to no more that a scaled velocity limit from the scaler 84 for relatively longer seek distances.

Figure 12:
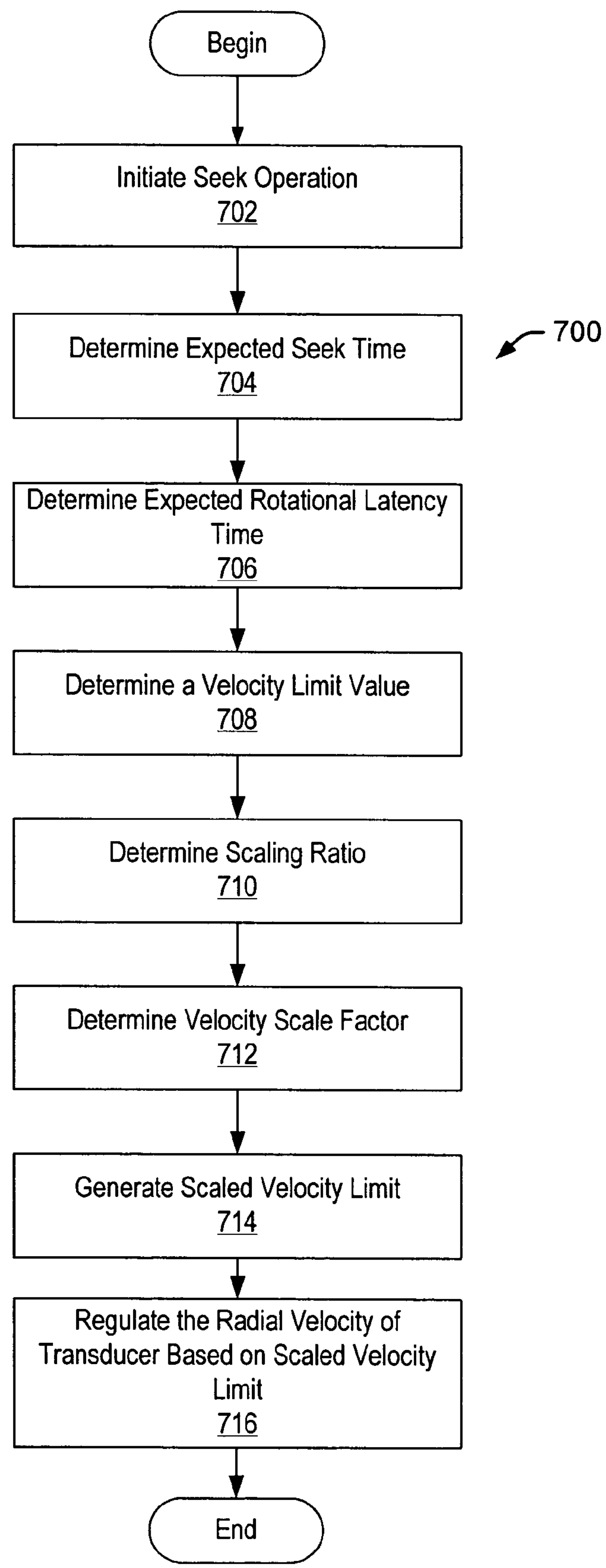
FIG. 12 is a flowchart showing operations for controlling seeking of a transducer while regulating its radial velocity in response to a scaled velocity limit which is determined based on expected seek time and expected rotational latency time according to some embodiments of the present invention.

FIG. 12 is a flowchart of operations of a process 700 for controlling seeking of the transducer 32 while regulating its radial velocity in response to a scaled velocity limit according to some embodiments of the present invention. The process 700 may be performed by the servo controller 56 shown in FIG. 3. At Block 702, a seek operation that seeks the transducer 32 from an initial track to a target track is initiated. At Block 704, an expected seek time is determined by, for example, selecting the seek time from among a plurality of seek times based on the seek distance between the initial and final tracks. At Block 706, an expected rotational latency time is determined based on, for example, an expected location of the transducer 32 after seeking to the target track and based on the location of an addressed data block. At Block 708, a velocity limit value is determined by, for example, selecting the velocity limit value from among a plurality of maximum currents based on the expected seek time. At Block 710, a scaling ratio is determined based on a ratio of the expected rotational latency time to the expected seek time. At Block 712, a velocity scale factor is determined based on, for example, a ratio of the tuning gain divided by the sum of the scaling ratio and the tuning gain. At Block 714, a scaled velocity limit is generated based on the determined velocity limit value and the velocity scaling factor. At Block 716, the radial velocity of the transducer 32 during a seek operation is regulated based on (e.g., limit to no more than about) the scaled velocity limit.

Figure 13:
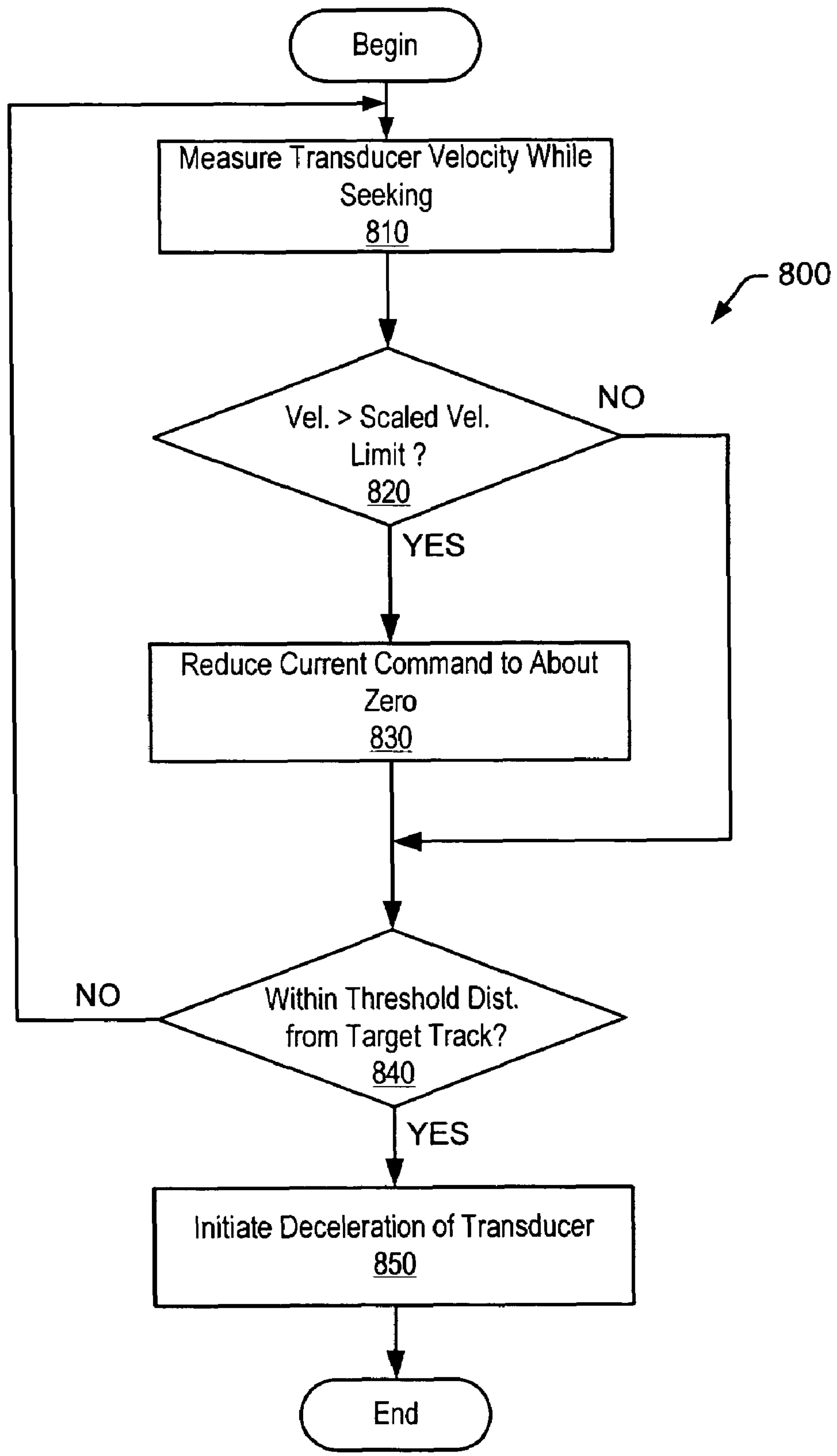
FIG. 13 is a flowchart showing operations for regulating the radial velocity of a transducer during a seek operation according to some embodiments of the present invention.

FIG. 13 is a flowchart of operations 800 for regulating the radial velocity of the transducer 32 during a seek operation. At Block 810, the velocity of the transducer 32 is measured during the seek. At Block 820, when the measured velocity exceeds the scaled velocity limit, the current command to the actuator motor 36 is reduced to about zero to allow the transducer 32 to coast at about the scaled velocity limit toward the target track. At Block 840, when the transducer 32 is within a threshold distance from the target track, then at Block 850 the current through the actuator motor 36 is increased in an opposite direction to decelerate the transducer 32 to zero as the transducer 32 reaches the target track.

Accordingly, in various embodiments of the present invention the radial velocity of a transducer is regulated during a seek operation in response to a scaled velocity limit which is determined based on an expected seek time and an expected rotational latency time. Such regulation of the maximum velocity of the transducer may conserve power and/or may reduce vibrations caused during seek operations.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method of controlling seeking of a transducer that is adjacent to a rotatable disk in a disk drive, the method comprising:

determining an expected seek time associated with moving the transducer from an initial track to a target track on the disk;

determining an expected rotational latency time associated with rotating the disk to move an addressed data block on the target track adjacent to the transducer after the transducer would be expected to arrive at the target track;

determining a scaled velocity limit by determining a velocity scale factor based on a ratio of the expected rotational latency time to the expected seek time, and by scaling a velocity limit value for the transducer by the velocity scale factor to determine the scaled velocit limit; and regulating radial velocity of the transducer relative to the disk in response to the scaled velocity limit while seeking the transducer from the initial track to the target track.

2. The method of claim 1, wherein determining a scaled velocity limit comprises:

determining a scaling ratio based on a ratio of the expected rotational latency time to the expected seek time;

determining the velocity scale factor based on the following equation, $$\text{velocity scale factor} = \frac{\text{tuning gain}}{\text{scaling ratio} + \text{tuning gain}}$$

wherein tuning gain is a predetermined number less than 1; and scaling the velocity limit value for the transducer by the velocity scale factor to determine the scaled velocity limit.

3. The method of claim 2, further comprising determining the velocity limit value based on a current level that saturates a transducer actuator motor when conducted therethrough.

4. The method of claim 2, further comprising selecting the velocity limit value from among a plurality of predefined velocity limit values based on locations of the initial track and the target track.

5. The method of claim 1, wherein regulating radial velocity of the transducer comprises:

repetitively sensing radial velocity of the transducer relative to the disk while seeking the transducer from the initial track to the target track; and limiting the radial velocity of the transducer to no more than about the scaled velocity limit.

6. The method of claim 5, wherein limiting the radial velocity of the transducer to no more than about the scaled velocity limit comprises reducing current that is conducted through a motor in the disk drive which moves the transducer radially across the disk based on the sensed radial velocity approaching the scaled velocity limit.

7. The method of claim 6, wherein the current conducted through the motor is reduced to about zero as the sensed radial velocity approaches the scaled velocity limit.

8. The method of claim 7, further comprising conducting current at a maximum level in a first direction through the motor to saturate the motor during an initial acceleration phase of seeking the transducer from the initial track to the target track until the sensed radial velocity of the transducer approaches the scaled velocity limit, and then reducing the current to about zero to limit the radial velocity of the transducer to no more than about the scaled velocity limit.

9. The method of claim 8, further comprising:

following the initial acceleration phase, maintaining about a zero current level through the motor during a coast phase to allow the transducer to coast which seeking toward the target track; and responsive to determining that the transducer has moved to within a threshold number of tracks of the target track, increasing current through the motor in a second direction, which is opposite to the first direction, to reduce the radial velocity of the transducer to zero as the transducer reaches the target track.

10. The method of claim 1, wherein;

when at least a threshold number of tracks are between the initial track and the target track, the radial velocity of the transducer is regulated in response to the scaled velocit limit; and when less than the threshold number of tracks are between the initial track and the target track, a current which is conducted through a motor which moves the transducer radially across the disk is regulated without responsiveness to the scaled velocity limit and so that the transducer settles on the target track a predetermined time before the addressed data block reaches the transducer.

11. The method of claim 1, wherein determining an expected seek time comprises selecting the expected seek time from among a plurality of predefined seek times based on locations of the initial track and the target track.

12. The method of claim 11, wherein determining an expected rotational latency time comprises selecting the expected rotational latency time from among a plurality of predefined rotational latency times based on relative locations of the transducer and the addressed data block and the expected seek time.

13. An apparatus for controlling seeking of a transducer that is adjacent to a rotatable disk in a disk drive, the apparatus comprising:

a servo controller configured to determine an expected seek time associated with moving the transducer from an initial track on the disk to a target track on the disk, to determine an expected rotational latency time associated with rotating the disk to move an addressed data block on the target track adjacent to the transducer after the transducer would arrive at the target track, to determine a scaled velocity limit by determining a velocity scale factor based on a ratio of the expected rotational latency time to the expected seek time and by scaling a velocity limit value for the transducer by the velocity scale factor to determine the scaled velocity limit, and to regulate radial velocity of the transducer relative to the disk in response to the scaled velocity limit while seeking the transducer from the initial track to the target track.

14. The apparatus of claim 13, wherein the servo controller is further configured to determining the scaled velocity limit by determining a scaling ratio based on a ratio of the expected rotational latency time to the expected seek time, determining the velocity scale factor based on the following equation, $$\text{velocity scale factor} = \frac{\text{tuning gain}}{\text{scaling ratio} + \text{tuning gain}},$$

wherein tuning gain is a predetermined number less than 1, and to scale the velocity limit value for the transducer by the velocity scale factor to determine the scaled velocity limit.

15. The apparatus of claim 14, wherein the servo controller is further configured to determine the velocity limit value on a current level that saturates the motor when conducted therethrough.

16. The apparatus of claim 14, wherein the servo controller is further configured to select the velocity limit value among a plurality of predefined velocity limit values based on locations of the initial track and the target track.

17. The apparatus of claim 13, wherein the servo controller is further configured to regulate radial velocity of the transducer by repetitively sensing radial velocity of the transducer relative to the disk while seeking the transducer from the initial track to the target track, and to limit the radial velocity of the transducer to no more than about the scaled velocity limit.

18. The apparatus of claim 17, wherein the servo controller is further configured to limit the radial velocity of the transducer to no more than about the scaled velocity limit by reducing current that is conducted through a transducer actuator motor in the disk drive which moves the transducer radially across the disk based on the sensed radial velocity approaching the scaled velocity limit.

19. The apparatus of claim 18, wherein the servo controller is further configured to reduce the current conducted through the motor to about zero as the sensed radial velocity approaches the scaled velocity limit.

20. The apparatus of claim 19, wherein the servo controller is further configured to allow current to be conducted at a maximum level through the motor in a first direction to saturate the motor during an initial acceleration phase of seeking the transducer from the initial track to the target track until the sensed radial velocity of the transducer approaches the scaled velocity limit and then to reduce the current to about zero to limit the radial velocity of the transducer to no more than about the scaled velocity limit.

21. The apparatus of claim 20, wherein following the initial acceleration phase, the servo controller is further configured to maintain about a zero current level through the motor during a coast phase to allow the transducer to coast which seeking toward the target track, and, responsive to the servo controller determining that the transducer has moved to within a threshold number of tracks of the target track, the servo controller is further configured to increase current through the motor in a second direction, which is opposite to the first direction, to reduce the radial velocity of the transducer to zero as the transducer reaches the target track.

22. The apparatus of claim 13, wherein the servo controller is further configured to regulate radial velocity of the transducer in response to the scaled velocity limit when at least a threshold number of tracks are between the initial track and the target track, and is configured to regulate a current, which is conducted through a motor which moves the transducer radially across the disk, without responsiveness to the scaled velocity limit and so that the transducer settles on the target track a predetermined time before the addressed data block reaches the transducer when less than the threshold number of tracks are between the initial track and the target track.

23. The apparatus of claim 13, wherein the servo controller is further configured to determining the expected seek time by selecting the expected seek time from among a plurality of predefined seek times based on locations of the initial track and the target track.

24. The apparatus of claim 23, wherein the servo controller is further configured to determining the expected rotational latency time by selecting the expected rotational latency time from among a plurality of predefined rotational latency time based on relative locations of the transducer and the addressed data block and the expected seek time.

* * * * *